United States Patent
Lee

(10) Patent No.: US 10,867,442 B1
(45) Date of Patent: Dec. 15, 2020

(54) CONFORMAL EDGE CONNECTIONS AND CLEANUP FOR UNCONNECTED, OVERLAPPING, AND CROSSING EDGE GEOMETRIES

(71) Applicant: Ansys, Inc., Canonsburg, PA (US)

(72) Inventor: Youngkyu Lee, Glenview, IL (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/380,349

(22) Filed: Apr. 10, 2019

Related U.S. Application Data

(60) Provisional application No. 62/699,896, filed on Jul. 18, 2018.

(51) Int. Cl.
  G06T 17/20 (2006.01)
(52) U.S. Cl.
  CPC ........ G06T 17/205 (2013.01); *G06T 2200/24* (2013.01)
(58) Field of Classification Search
  None
  See application file for complete search history.

(56) References Cited

U.S. PATENT DOCUMENTS

| | | | | |
|---|---|---|---|---|
| 5,453,934 A | * | 9/1995 | Taghavi | G06T 17/20 345/419 |
| 5,768,156 A | * | 6/1998 | Tautges | G06T 17/20 703/2 |
| 10,169,864 B1 | * | 1/2019 | Bagherinia | G06T 7/143 |
| 2018/0096059 A1 | * | 4/2018 | Frank | G06F 16/358 |

\* cited by examiner

*Primary Examiner* — Yanna Wu
(74) *Attorney, Agent, or Firm* — Jones Day

(57) ABSTRACT

Systems and methods are provided herein for remedying edge and/or face defects of a geometric model. The geometric model of a physical object is received for modeling. The geometric model includes model edges. Each edge is segmented into segments according to a grid having cells overlaid onto the geometric model. A respective centroid of each respective cell is having a segmented edge within the respective cell is determined. A current cell adjacent to an adjacent cell in the grid is identified. The current cell has a segmented edge. A centroid of the current cell is connected with a centroid of the adjacent cell to generate a refined segmented edge. The refined segment is projected onto a corresponding model edge to generate a projected edge. A refined model having one or more projected edges is provided to a graphical user interface for further model characterization of the physical object.

25 Claims, 14 Drawing Sheets

CONFORMAL EDGE CONNECTIONS AND CLEANUP FOR UNCONNECTED, OVERLAPPING, AND CROSSING EDGE GEOMETRIES

CROSS-REFERENCE TO RELATED APPLICATIONS

This application claims priority to U.S. Provisional Application No. 62/699,896, entitled "CONFORMAL EDGE CONNECTIONS AND CLEANUP FOR UNCONNECTED, OVERLAPPING AND CROSSING EDGE GEOMETRIES," filed Jul. 18, 2018, the entirety of which is herein incorporated by reference.

TECHNICAL FIELD

The present disclosure relates generally to the field of simulations, and, more specifically, to computer-aided design models.

BACKGROUND

Computer-aided design (CAD) models can be useful in various engineering efforts involved in developing and/or testing of a particular device. Due to simulations being performed within a computing environment, the model may be incomplete or contain defects such as geometric corruption. An example geometric corruption can include unconnected edges and/or faces. To build an engineering model for finite element analysis or finite volume analysis, a user typically goes through a process called geometry cleanup or healing to remedy geometric corruption. A majority of tools used for geometry cleanup or healing directly work on the geometry.

SUMMARY

In one aspect, edge defects of a geometric model are remedied. The geometric model of a physical object is received for modeling. The geometric model includes model edges. Each edge is segmented into segments according to a grid having cells overlaid onto the geometric model. A respective centroid of each respective cell is having a segmented edge within the respective cell is determined. A current cell adjacent to an adjacent cell in the grid is identified. The current cell has a segmented edge. A centroid of the current cell is connected with a centroid of the adjacent cell to generate a refined segmented edge. The refined segment is projected onto a corresponding model edge to generate a projected edge. A refined model having one or more projected edges is provided to a graphical user interface for further model characterization of the physical object.

In another aspect, face defects of a geometric model are remedied. The geometric model of a physical object is received for modeling. The geometric model includes a plurality of faces. For each face, one or more edges in proximity of a face are identified based on a predefined tolerance level. One or more boundary edges of the face defining a shared topology are determined. A surface mesh is generated on the shared topology. The shared topology with the surface mesh is provided to the graphical user interface for further characterization of the physical object.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter constructs clean edge-networks for disconnected computational geometry objects. The subject matter also constructs a shared topology for a disconnected faces of a geometric model. Use of the subject matter described herein simplifies tolerance handling in the edge cleanup and enables a variable tolerance control by changing local cell sizes in the background grid. This simplified handling can minimize processing time of a computing environment running a simulation by, for example, decreasing the amount of memory utilized to run the simulation.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

Object simulations using modeling, such as CAD modeling can inform users of various physical responses of objects when subjected to real world conditions such as stress or other mechanical forces. Modeling of physical, real world objects is largely dependent upon the information within a simulation, such as geometric parameters. In some simulations, physical, real world objects are portrayed as a series of edges and faces. The subject matter described herein constructs a shared topology (e.g., well-connected edges and/or faces) by remedying various geometric defects and/or imperfections (e.g., gaps). The edge connections are analyzed using an automatically generated background grid. A connected set of edges (e.g., dual-edge network) is extracted by connecting the centroids of a pair of neighboring grid cells intersected by the input geometry edges. With additional refinement or background grid density specifications provided, edge connections are analyzed within variable tolerances. Surfaces of a shared topology can be constructed by analyzing the groups of edge segments in the edge network and the input surface geometry from the CAD model. This shared topology construction can enable users to generate models for various simulation, such as engineering simulations, using numerical methods such as the finite element method or finite volume method.

Figure 1:
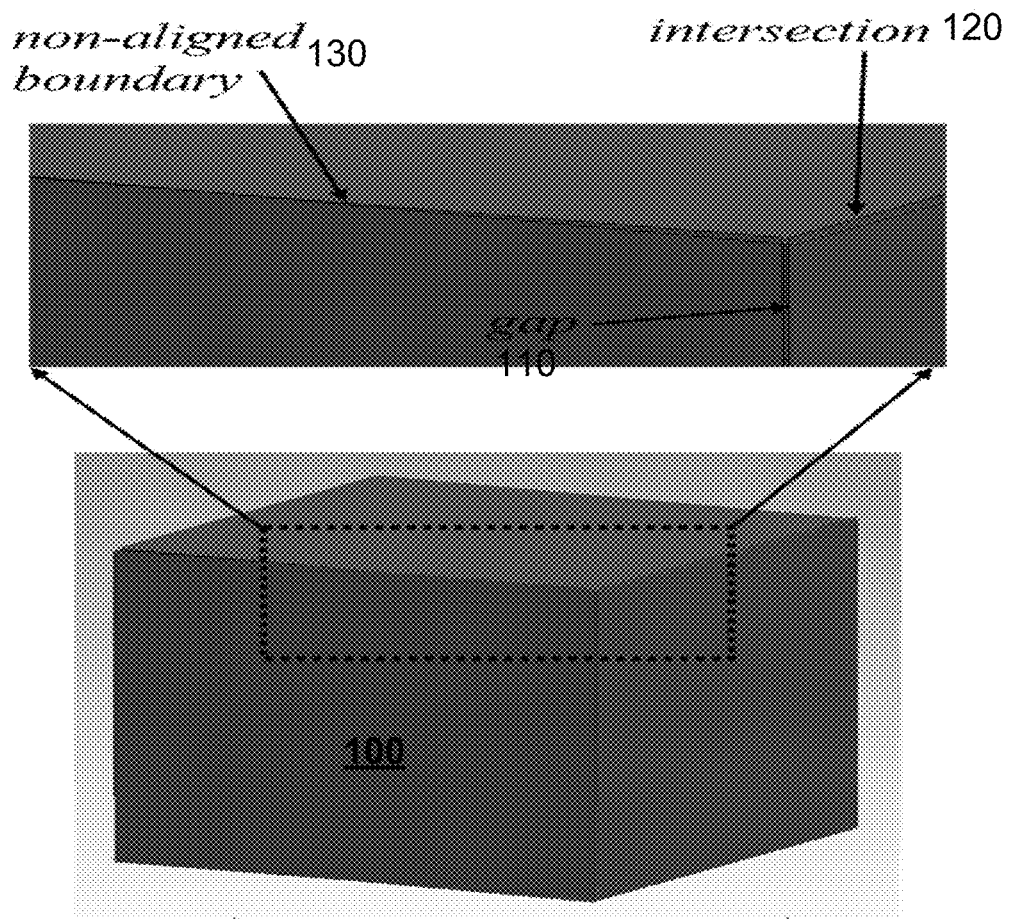
FIG. 1 illustrates an example modeled object of a physical world object having an example defect within the modeled object.

FIG. 1 illustrates an example modeled object 100 of a physical world object having an example defect (e.g., gap 110) within modeled object 100. Modeled object 100 can include various inputs such as user input via a graphical user interface creating the modeled object 100, an image (such as a computed tomography scan or mechanical imaging) of a physical world object, or an imported CAD model. Gap 110, intersection 120, and non-aligned boundary 130 are example defects that can impact modeling by, for example, generating inaccurate modeling results, increasing modeling processing time due to error handling, and/or preventing generation of results due to lack of information required for successful modeling. Modeling of a physical world object can be done using a number of linear segments which collectively represent the physical world object. Defects (e.g., gap 110, intersection 120, non-aligned boundary 130) can exist within modeled object 100 when, for example, some linear segments do not connect with one another. Mathematical models typically rely upon connected linear segments to perform various analysis such as stress analysis. In order to ensure interconnection between linear segments within the modeled object 100, localized operations can be performed to cleanup or heal such defects.

Gap 110 illustrates an example defect of unconnected edge crossings and intersections in CAD models. The gap 110 may be introduced by, for example, geometry corruption in CAD modeling, incomplete CAD modeling practice, and/or translation of CAD models between different software programs. Modeled object 100 also contains defects at intersection 120 where two edges of a top face and a side face of the modeled object 100 do not connect. Non-aligned boundary 130 is another example defect of modeled object 100.

Figure 2:
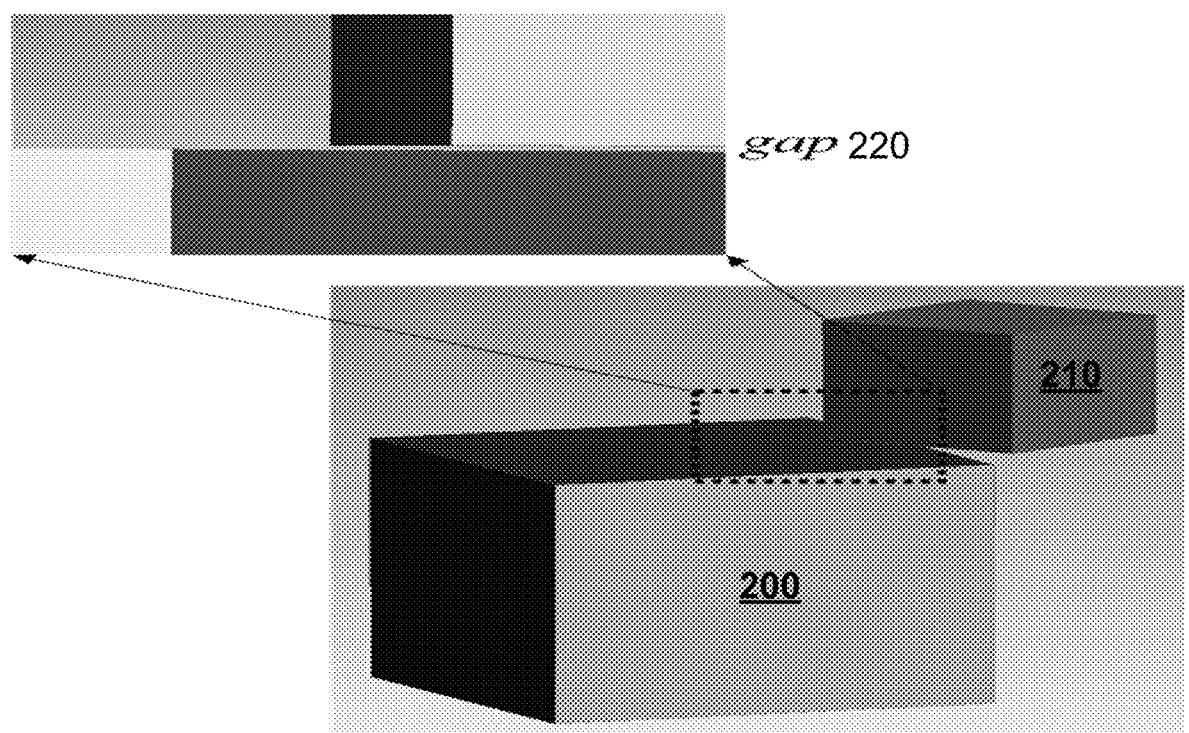
FIG. 2 illustrates an example of two modeled objects of two physical world objects having an unshared topology.

FIG. 2 illustrates an example of two modeled objects 200, 210 of two physical world objects having an unshared topology (e.g., gap 220) between modeled object 200 and modeled object 210. In this example, modeled objects 200, 210 are joined together in the physical world, yet the simulation model does not accurately portray this connection. Use of the subject matter described herein can facilitate joining of modeled objects 200, 210 to create a shared topology mesh model of modeled objects 200, 210 to enable a more accurate and/or efficient simulation.

Figure 3A:
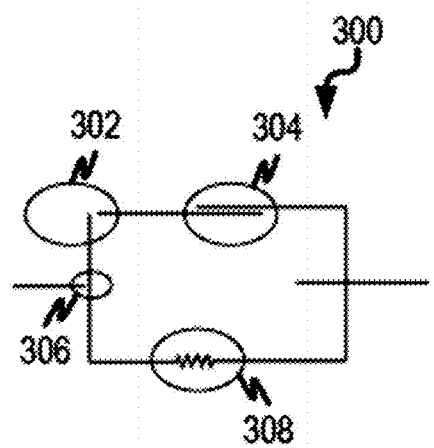
FIGS. 3A-3E illustrate example geometric cleanup or healing of a two-dimensional modeled object.

FIGS. 3A-3E illustrate example geometric cleanup or healing of two-dimensional (2D) modeled object 300 of a physical world object. As illustrated in FIG. 3A, modeled object 300 includes defects 302, 304, 306, 308 within its original input edges. Defect 302 illustrates an unconnected edge crossing between a first edge and a second edge of a geometric face. Defect 304 illustrates a spatial gap between two linear segments of the same edge. Defect 306 illustrates another example unconnected edge crossing between a linear segment and an edge of modeled object 300. Defect 308 illustrates non-uniformity of an edge of modeled object 300. In some variations, differing cleanup or healing techniques can be used to address the varying defects 302, 304, 306, 308 of modeled object 300. In other variations, a single technique can address defects 302, 304, 306, 308 of modeled object 300.

Figure 3B:
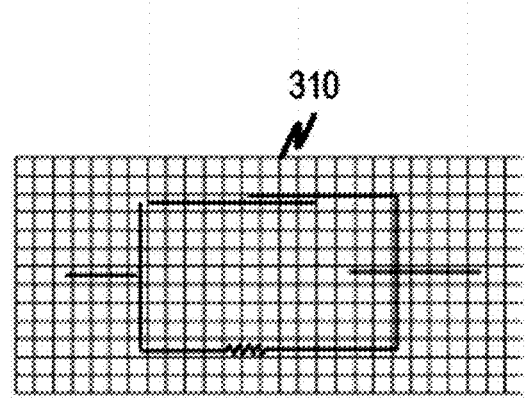

By way of example, to address defects 302, 304, 306, 308, a background grid 310 made up of a number of cells (e.g., each individual grid box) is overlaid on modeled object 300, as illustrated in FIG. 3B. Each cell segments one or more edges of modeled object 300 into one or more segments. For simplicity, background grid 310 is illustrated as a uniformly refined grid having cells of equal area. It is noted that background grid 310 can be any number of grid types such as an octree grid, a packed sphere grid, or a polyhedral element grid. For example, a cell can be subdivided into any number of smaller cells based on the presence of a segment within the cell or a defect within the cell as described in more detail in FIG. 5. Cells containing segments of modeled object 300 are identified, as illustrated by highlighting 320 in FIG. 3C.

Figure 3C:
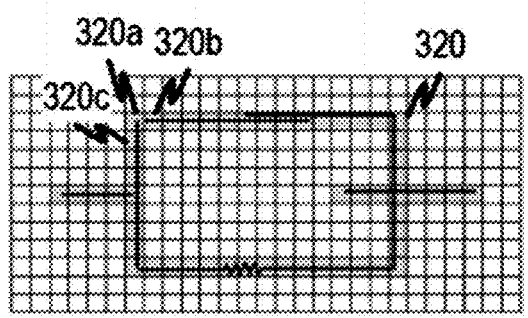
Figure 3D:
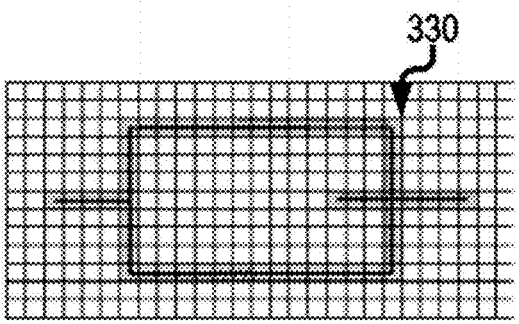
Figure 3E:
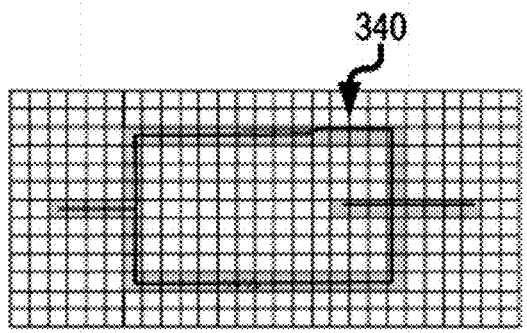

FIG. 3D illustrates an example dual-edge network 330 constructed by connecting the centroids of cells having segmented edges of FIG. 3C. Based on the identification of cells containing segments as identified in FIG. 3C, a centroid of each cell is determined. For example, cells 320a, 320b, 320c, as illustrated in FIG. 3C, contains segments of an edge of modeled object 300. A centroid of cell 320a is determined using any mathematical technique for identifying centroids based on the cell geometry. Adjacent cells to 320a containing segments are identified (e.g., cell 320b, 320c). A refined segmented edge is generated by connecting the centroid of cell 320a with the centroid of cell 320b. A refined segmented edge is also generated by connecting the centroid of cell 320a with the centroid of cell 320c. Such processing continues for each cell having a segmented edge until each of the identified cells having segmented edges have been processed. As illustrated in FIG. 3D, defects 302, 304, 306, 308 having spatial gaps or unconnected edge crossings are remedied using this centroid connection. The dual-edge network 330 of FIG. 3D is projected on the modeled object 300 to generate a refined model 340 having projected edges as illustrated in FIG. 3E. An object is "projected" when nodes of the edge network (e.g., dual edge network 330) are moved onto the original geometry edges (e.g., onto modeled object 300). Moving of the edge ends to the closest points on the original geometry edges is sufficient for projection.

Figure 4A:
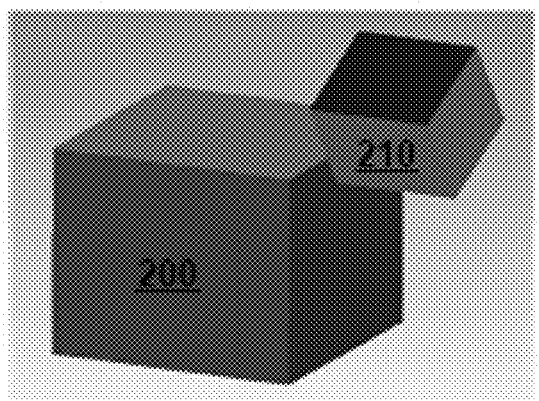
FIGS. 4A-4D illustrate example geometric cleanup or healing of the three-dimensional modeled objects of FIG. 2.
Figure 4B:
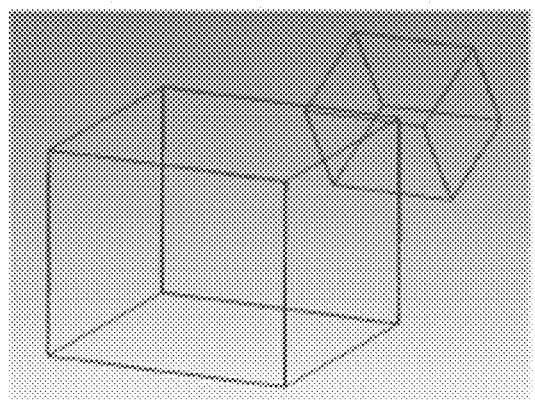
Figure 4C:
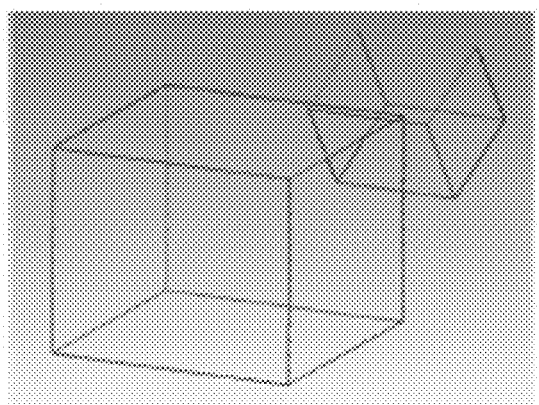
Figure 4D:
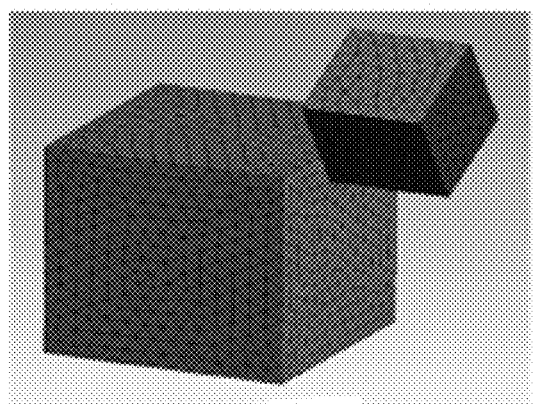

It can be appreciated that while FIGS. 3A-3E illustrate a 2D modeled object, the described techniques can also be applied to any number of dimensions, including, but not limited to, three-dimensional (3D) objects. For example, FIGS. 4A-4D illustrate example geometric cleanup or healing of 3D modeled objects 200, 210 of FIG. 2. FIG. 4A illustrates an example of two modeled objects 200, 210 of two physical world objects with defects. FIG. 4B illustrates a raw edge network of modeled objects 200, 210. FIG. 4C illustrates a dual-edge network (e.g., cleaned and remeshed edge network) of modeled objects 200, 210 generated using techniques as described in FIGS. 3A-3E. FIG. 4D illustrates a refined model of projected edges (e.g., mesh on shared topology) generated using the techniques as described in FIGS. 3A-3E.

Figure 5A:
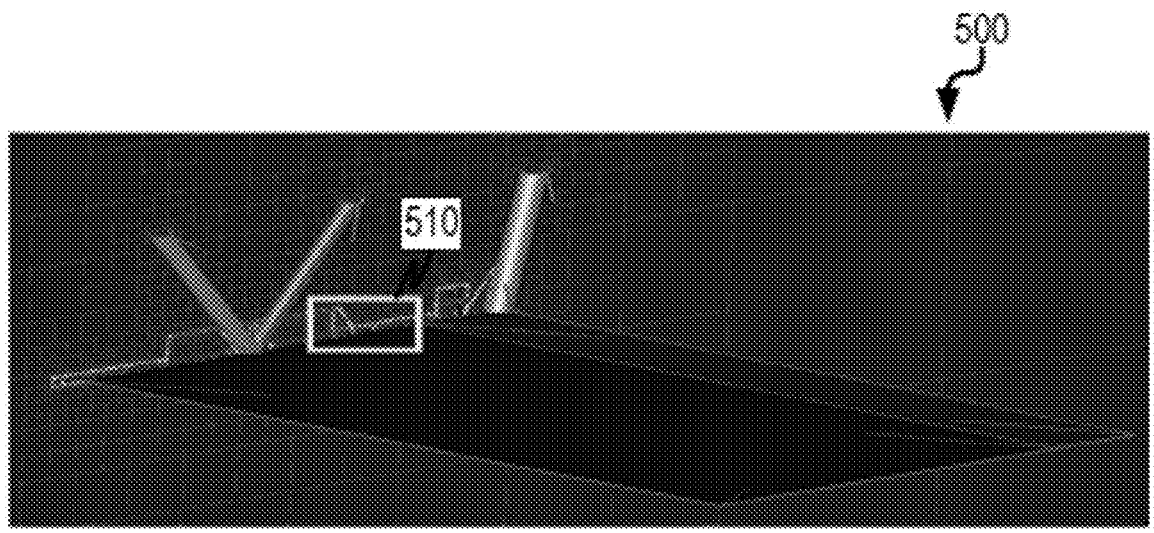
FIGS. 5A-5C illustrate example three-dimensional dual-edge network construction for the geometry of a shell structure within a modeled object.
Figure 5B:
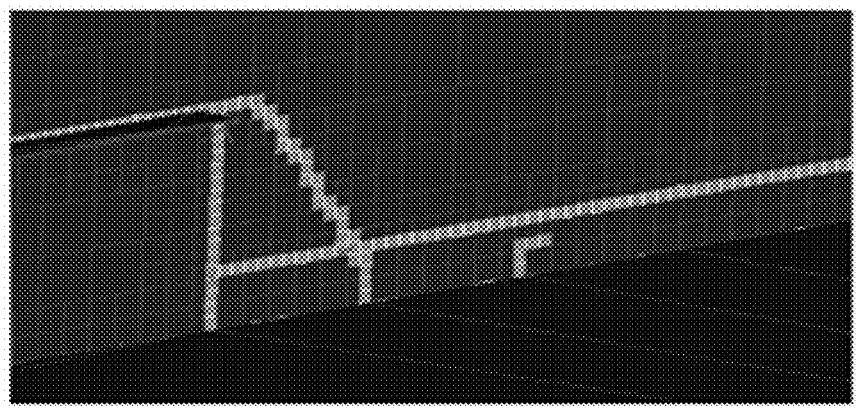
Figure 5C:
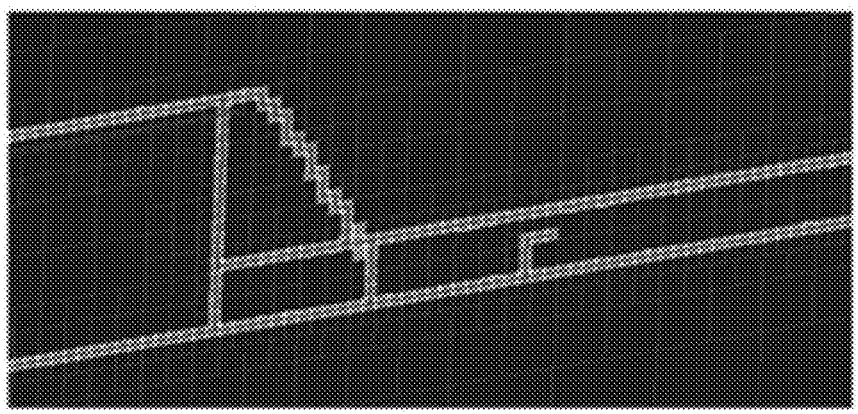

FIGS. 5A-5C illustrate example 3D dual-edge network construction for the geometry of a shell structure 510 within a modeled object 500. FIG. 5A illustrates an example cutting plane of an adapted octree grid overlaid over the geometry generated using techniques as described in FIGS. 3A-3E. FIG. 5B illustrates the identified octants within the background grid which are intersected by the original edges generated using techniques as described in FIGS. 3A-3E. FIG. 5C illustrates the dual-edge network generated by connecting the centroids of those intersecting octants using techniques as described in FIGS. 3A-3E. As illustrated in FIGS. 5A-5C, cells of the background grid are not uniformly refined. In some variations, cells within a portion of the background grid are subdivided based on a predefined refinement level. For example, a user can define a refinement level for the modeled object. Based on this refinement level, the techniques as described in FIGS. 3A-3E are repeated until a certain refinement level is reached. The repetition of the techniques of FIGS. 3A-3E is based on the presence of segments within a particular cell of the portion of the background grid having the predefined refinement level.

Figure 6A:
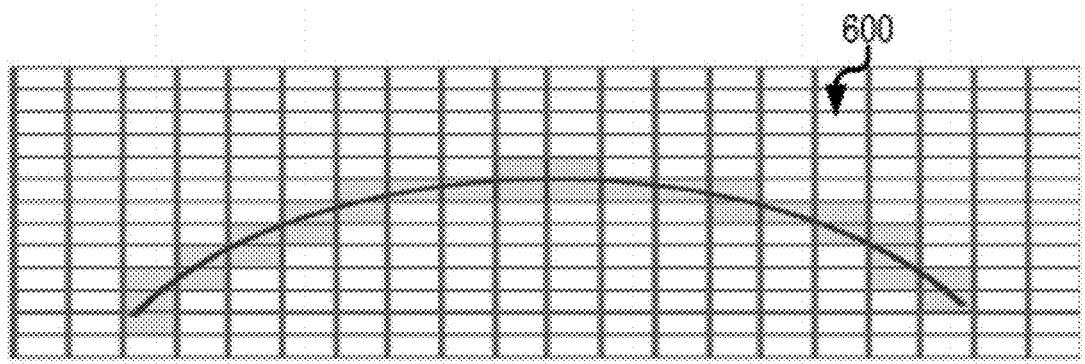
FIGS. 6A-6C illustrate example undesirable artifacts and cleaning up in dual edge network construction.
Figure 6B:
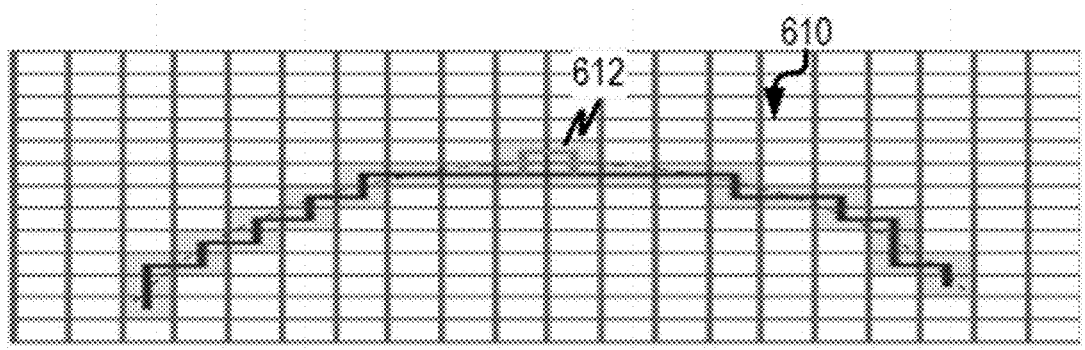
Figure 6C:
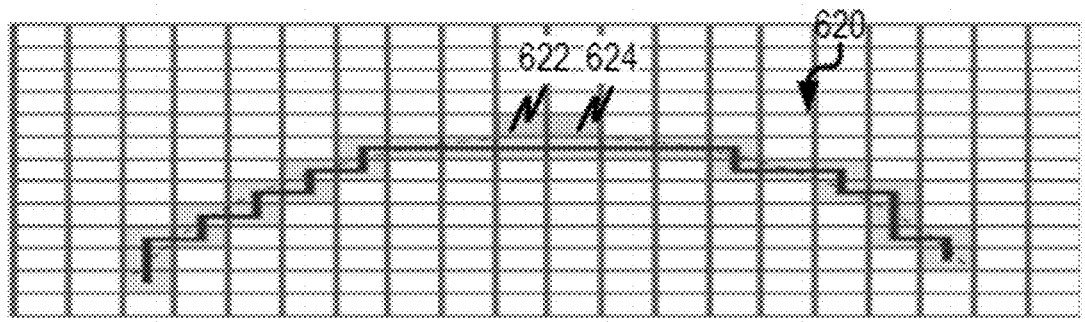

In some variations, an edge segment shares one end with a single neighboring edge (e.g., a two-manifold edge). At some locations where multiple segments cross each other, there are nodes being shared by multiple edges. In some circumstances, the dual-edge network can include undesired or abnormal artifacts. FIGS. 6A-6C illustrate example undesirable artifacts and cleaning up in dual edge network construction. In some cases, the techniques as described in FIGS. 3A-3E after applied to raw-edge network 600 can result in a short cyclic loop 612 as illustrated in dual-edge network 610. Such configurations can be resolved by detecting short cyclic loops (such as short cyclic loop 612) of the dual-edge network. A portion of the short cyclic loop 612 can be removed using a thinning technique. The thinning technique removes the octants from the intersecting octant pool which contain the short cyclic loop 612. FIG. 6C illustrates a refined model 620 removing the short cyclic loop 612 using the thinning technique (e.g., octants 622, 624 were removed).

Figure 7A:
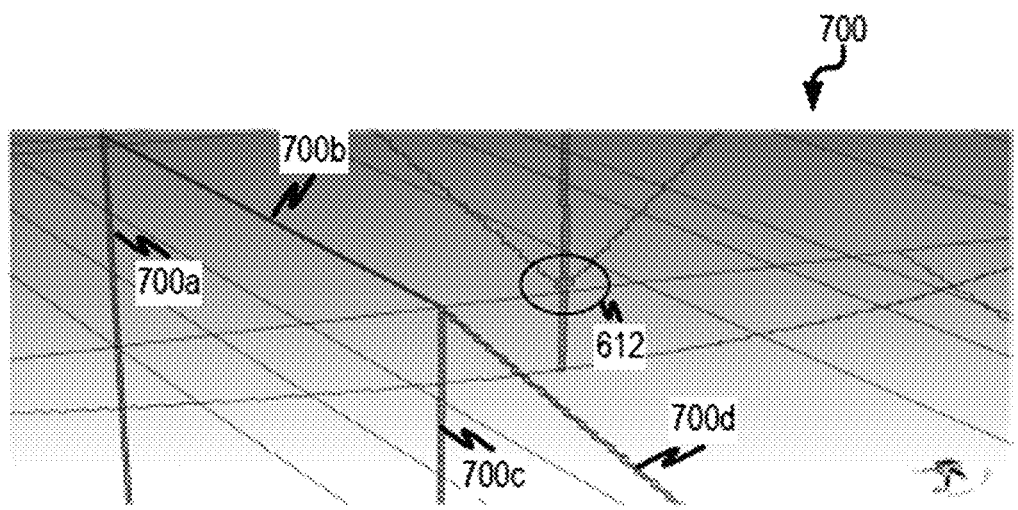
FIGS. 7A-7B illustrate examples of a raw dual-edge network and a refined edge network of a three-dimensional structure generated using the techniques as described in FIGS. 3A-3E.
Figure 7B:
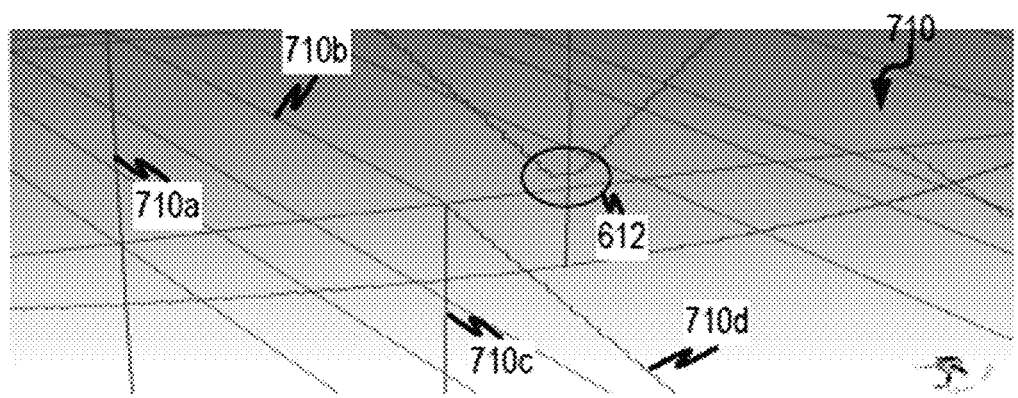

FIG. 7A illustrates an example raw dual-edge network 700 of a 3-D structure 510, including short cyclic loops (e.g., short cyclic loop 612) described in FIGS. 6A-6C. FIG. 7B illustrates a refined edge network 710 of raw dual-edge network 700 using the thinning technique described in FIGS. 6A-6C. As illustrated in FIG. 7B, in addition to removal of short cyclic loop 612, the thinning technique can also refine edges such as refined edges 710a, 710b, 710c, 710d of dual-edge network edges 700a, 700b, 700c, 700d respectively.

Figure 8A:
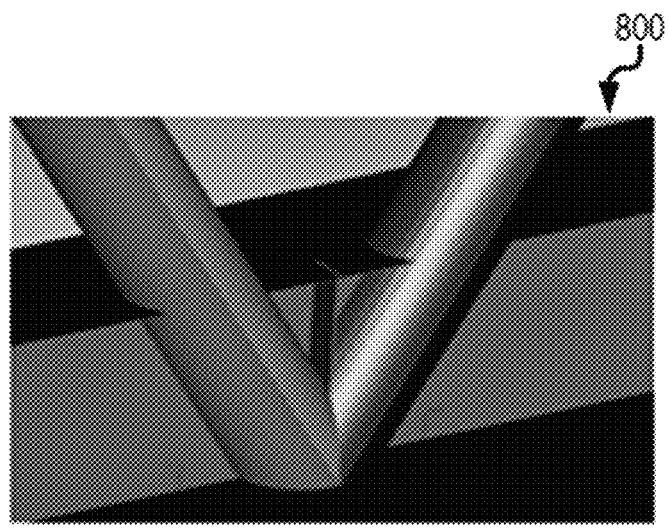
FIGS. 8A-8C illustrate additional examples of generating refined models using the techniques as described in FIGS. 3A-3E.
Figure 8B:
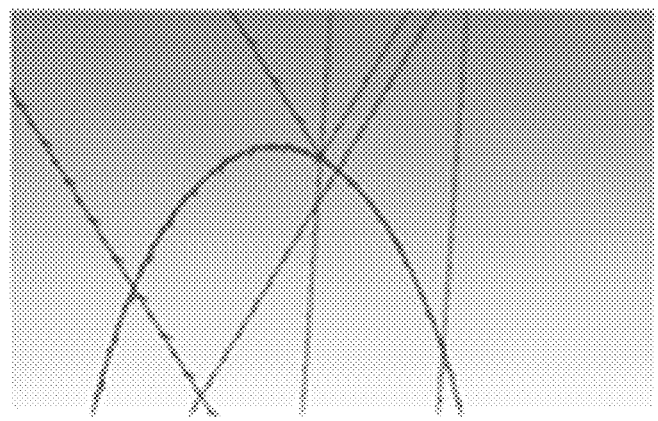
Figure 8C:
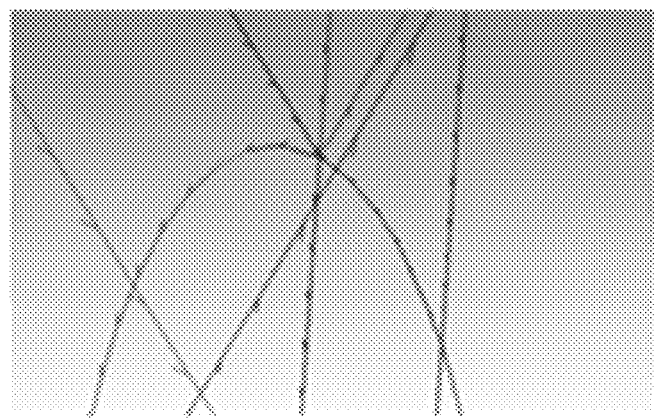

The dual-edge network is projected by moving nodes onto the original geometry edges. The edge ends are projected to the closest points on the original edges. Many variations of projection strategies can be used. The sizes of background cells used to extract the edge-network can be smaller than the required sizes for the finite element or volume analyses. The constructed edge network is remeshed by additional size specifications after the projection. FIGS. 8A-8C illustrate additional examples of generating refined models using the techniques as described in FIGS. 3A-3E. FIG. 8A illustrates a portion 800 of modeled object 500. FIG. 8B illustrates example original edges corresponding to the portion 800. FIG. 8C illustrates example refined segment edges using the techniques as described in FIGS. 3A-3E.

Figure 9A:
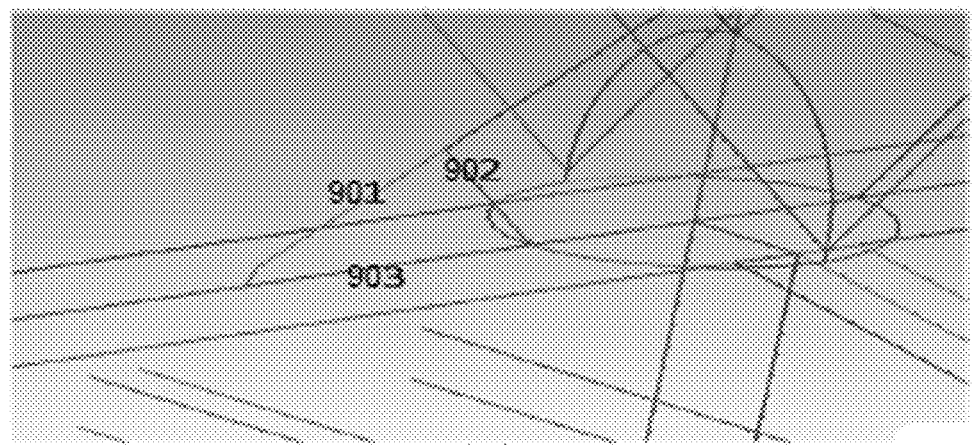
FIGS. 9A-9C illustrate examples of generating refined models of a modeled object using topological faces of the modeled object.
Figure 9B:
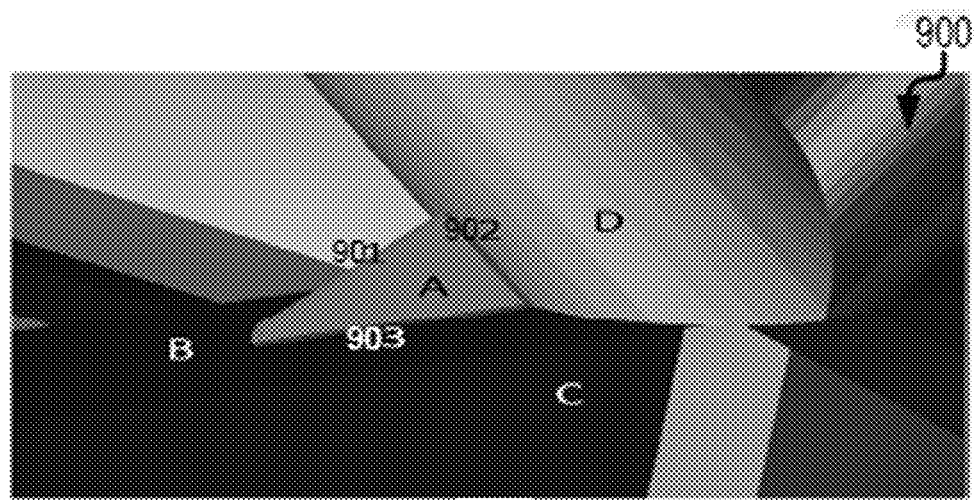
Figure 9C:
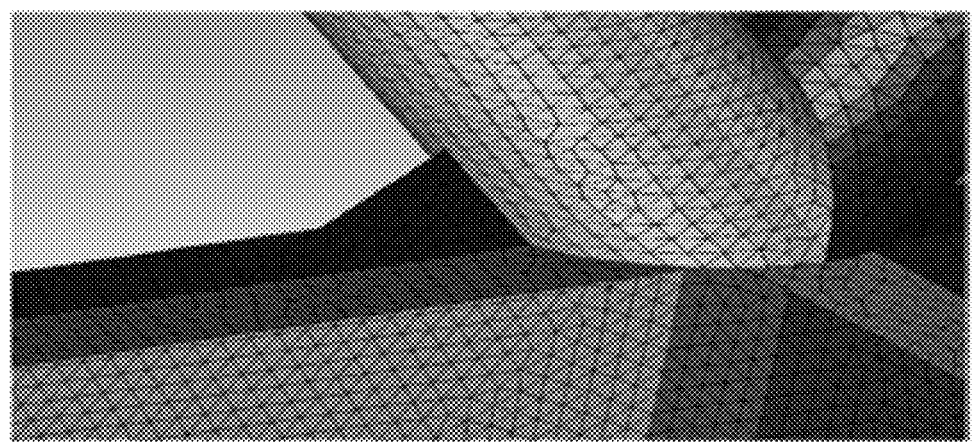

FIGS. 9A-9C illustrate examples of generating refined models of a modeled object using topological faces of the modeled object. Using similar techniques as those described in FIGS. 3A-3E, edges of each face of a modeled object are identified. For example, FIG. 9A illustrates an example dual-edge network generated for the faces of a modeled object. Edges 901, 902, 903 are identified. As illustrated in FIG. 9B, for example, modeled object 900 has various faces or surfaces, including faces A, B, C, D. Edges 901, 902, 903 define the boundary of face A as illustrated in FIG. 9B. While edge 901 belongs solely to face A, edge 902 lies inside of face D. Likewise, edge 903 is a boundary edge of face A and face C. Edge 903 is also an interior edge of face B.

FIG. 9C illustrates a generated surface mesh having a shared topology among faces A, B, C, D of modeled object 900. To identify such association, the edges in proximity of a particular face are identified. In some variations, the edges are within a tolerance (such as a tolerance set by a user via a graphical user interface) from a given face are identified.

Figure 10A:
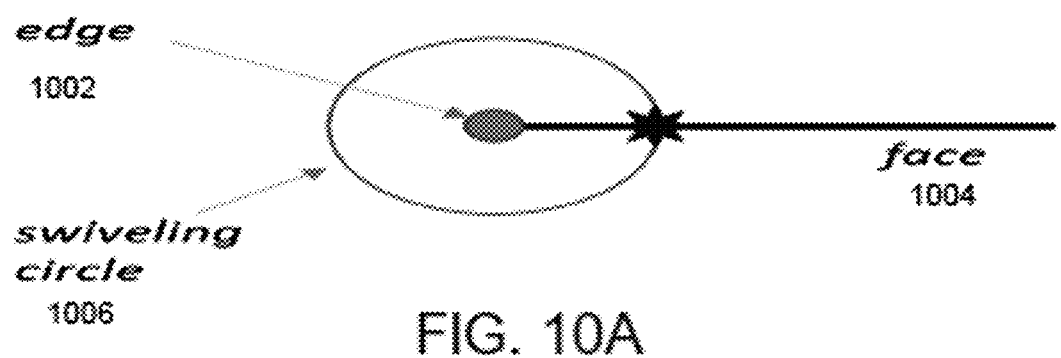
FIGS. 10A-10B illustrate example applications of a swiveling algorithm to identify boundary and/or interior edges of a modeled object.
Figure 10B:
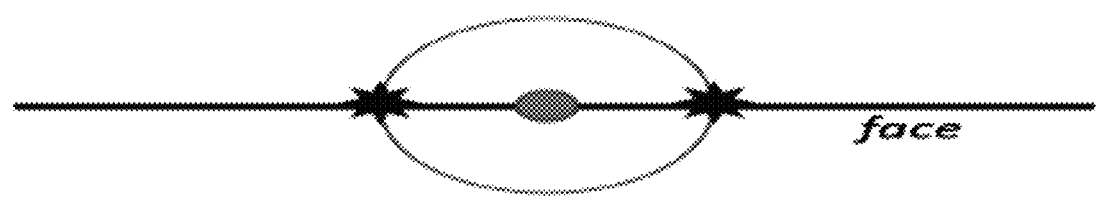

A "swiveling" algorithm can be used to identify whether an edge is a boundary edge or an interior edge of a face. The swiveling algorithm draws a virtual circle perpendicular to an edge segment of an edge zone and counts the number of intersections between the circle and the geometry face. FIGS. 10A-10B illustrate example applications of a swiveling algorithm to determine whether an identified edge of a modeled object is a boundary edge or an internal edge of the face. For example, FIG. 10A illustrates identification of a boundary edge of a face having one intersection point (e.g., used to identify edge 901 of face A). FIG. 10B illustrates identification of an internal edge of the face (e.g., used to identify edges 902 of face D, edge 903 of face B). Counting the number of intersection points of the virtual circle with an edge identifies whether an identified edge is a boundary edge or an internal edge. For example, a boundary edge has one intersection, as illustrated in FIG. 10A, while an interior edge has two intersections, as illustrated in FIG. 10B. The connections and associations between the input geometry faces and a group of edge segments on the dual-edge network can be established using the swiveling technique. In other words, a surface topology of shared edges can be constructed. A mesh generated on the shared topology is illustrated in FIG. 9C. As illustrated in FIG. 9C the disconnected faces in the input model share the common nodes along the boundary and the imbedded interior edges.

Figure 11:
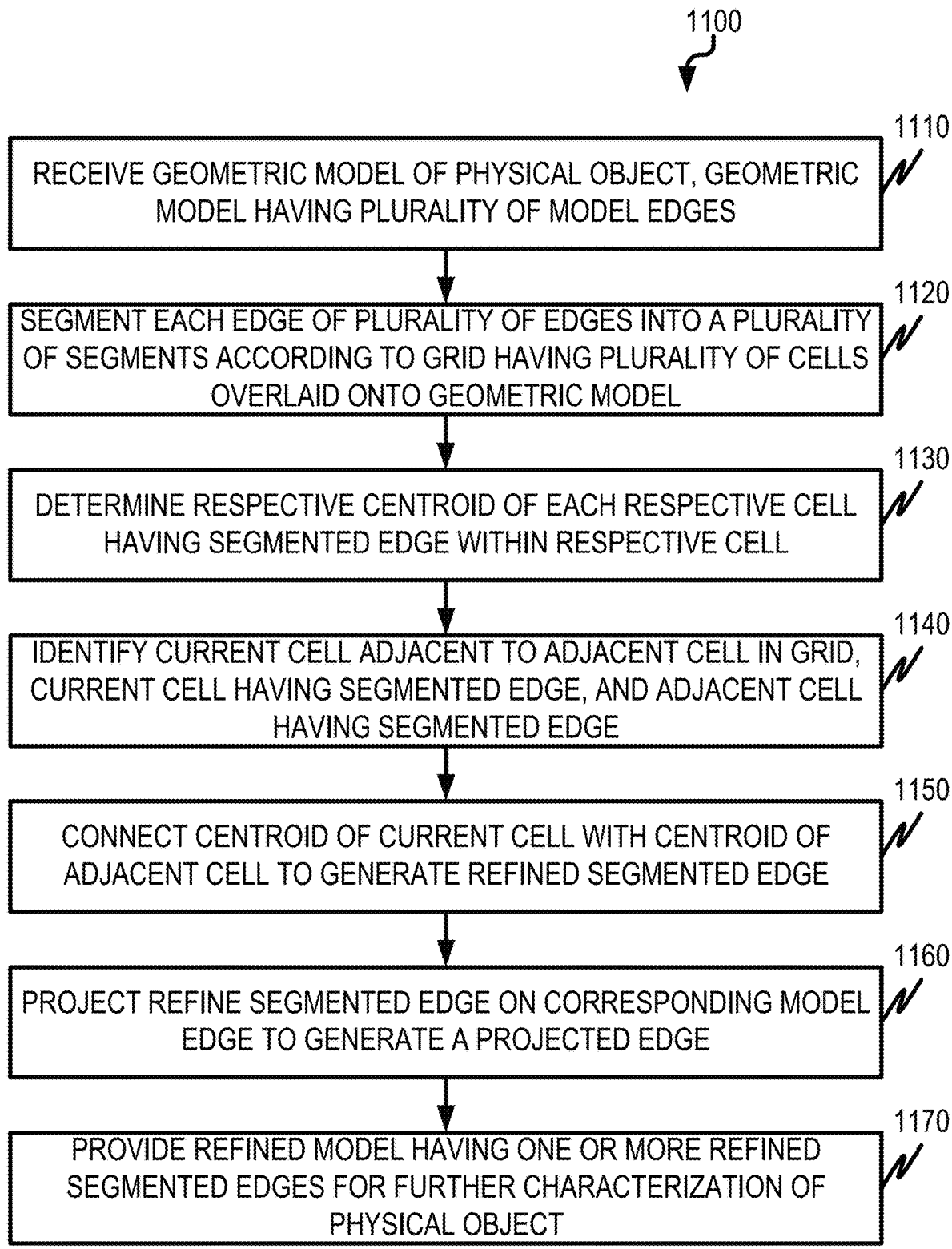
FIG. 11 is an example process flow diagram for remedying edge defects of a geometric model.

FIG. 11 is an example process flow diagram 1100 for remedying edge defects of a geometric model. A geometric model of a physical object is received at 1110. The geometric model includes a plurality of model edges. Each edge of the plurality of model edges are segmented into a plurality of segments according to a grid having a plurality of cells overlaid onto the geometric object at 1120. A respective centroid is determined for each respective cell containing a segmented edge within the respective cell at 1130. A current cell adjacent to an adjacent cell in the grid is identified at 1140. The current cell has a segmented edge and the adjacent cell has a segmented edge. A refined segmented edge is generated by connecting a centroid of the current cell with a centroid of an adjacent cell having a segmented edge at 1150. The refined segmented edge is projected on the corresponding model edge to generate a projected edge at 1160. A refined model having one or more projected edges is provided for further characterization of the physical object at 1170. For example, the refined model can be used to modify a design of an existing physical, real world object. In another example, a physical, real world object can be built and adjusted based upon the refined model.

Figure 12:
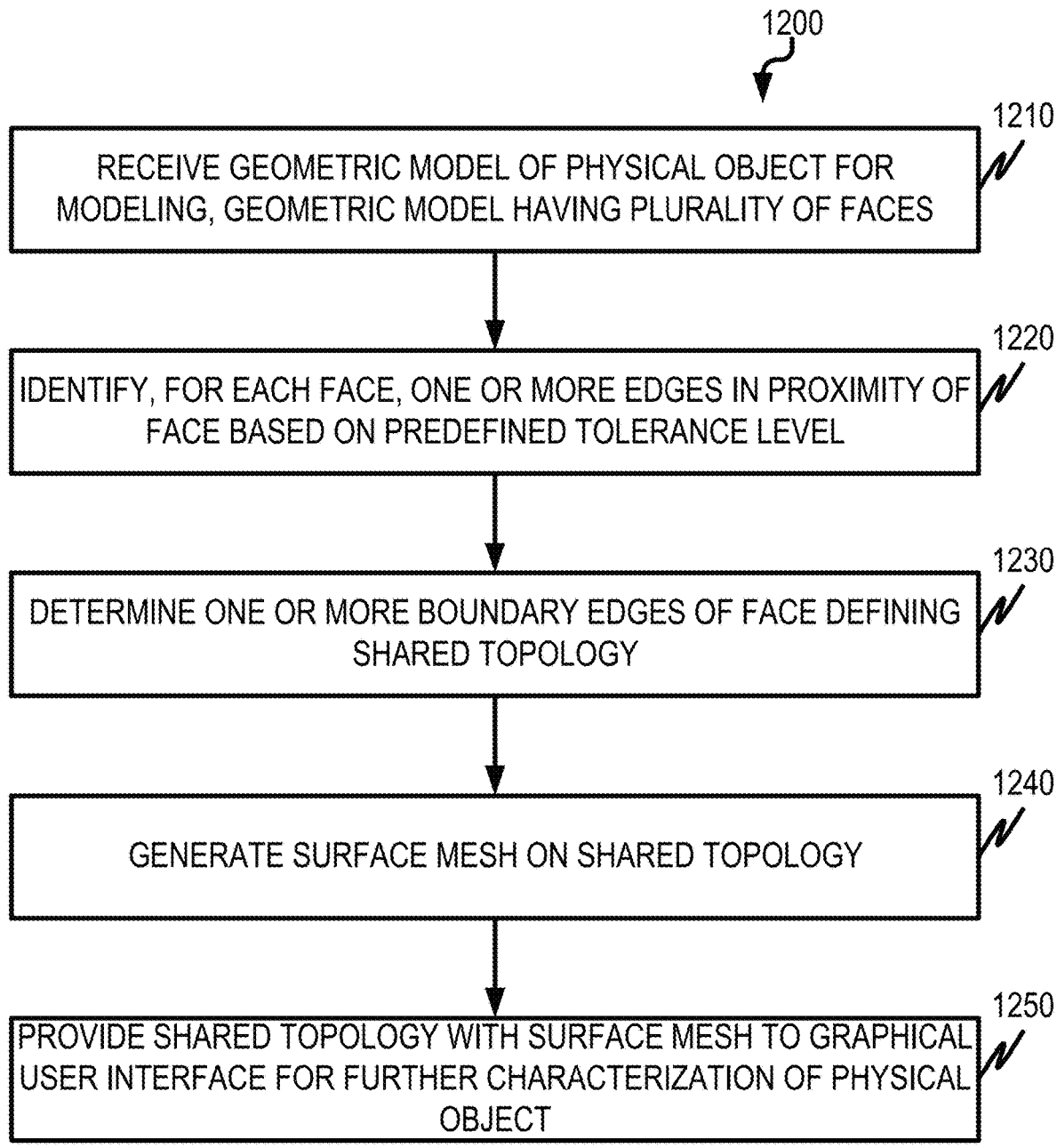
FIG. 12 is an example process flow diagram for remedying face defects of a geometric model.

FIG. 12 is an example process flow diagram 1200 for remedying face defects of a geometric model. A geometric model of a physical object for modeling is received at 1210. The geometric model includes a plurality of faces. For each face, one or more edges are identified as well as their orientation in proximity of the face based on a predefined tolerance level at 1220. Using the swiveling algorithm, one or more boundary edges of the face defining a shared topology are determined at 1230. A surface mesh is generated on the shared topology at 1240. The shared topology with the generated surface mesh is provided to a graphical user interface for further characterization of the physical object at 1250.

Figure 13:
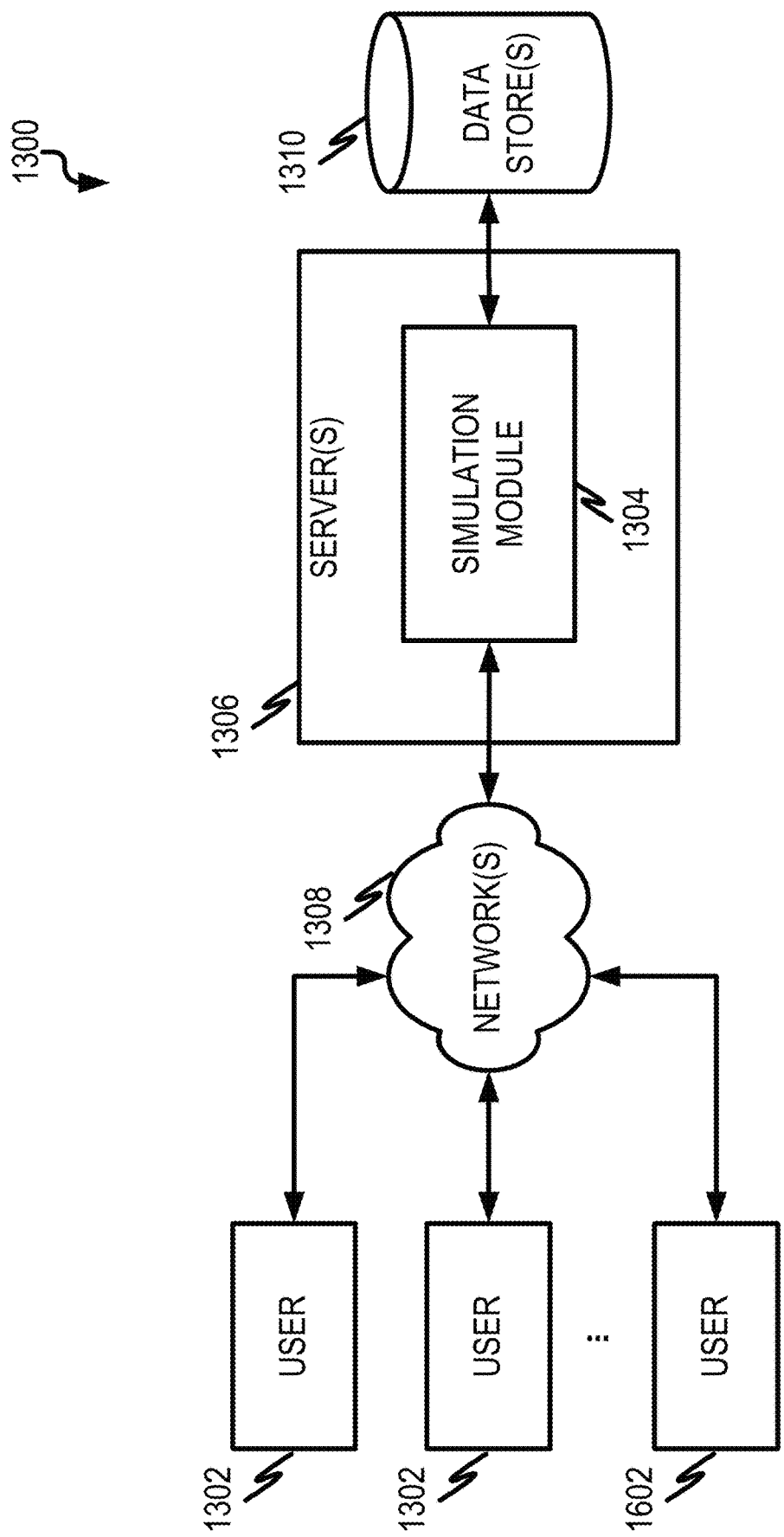
FIG. 13 illustrates an example computer-implemented environment for implementing various aspects described herein.

FIG. 13 illustrates an example computer-implemented environment 1300 wherein users 1302 can interact with a simulation module 1304 having the various conformal edge techniques as described herein hosted on one or more servers 1306 through a network 1308. The simulation module 1304 can assist the users 1302 with interfacing between an object-oriented modeling language based interface and a hardware description language based interface.

As shown in FIG. 13, the users 1302 can interact with the simulation module 1304 through a number of ways, such as over one or more networks 1308. One or more servers 1306 accessible through the network(s) 1308 can host the simulation module 1304. The one or more servers 1306 can also contain or have access to one or more data stores 1310 for storing data for the simulation module 1304.

Systems and methods as described herein may enable IC design that reduces timing margins via more precise timing determinations using targeted dynamic power supply and ground level simulations. Traditional approaches often miss a number of potentially important physical effects that cause miscorrelation between simulated and actual devices (particularly at geometries at 10 nm and below). Measurements indicate that conventional approaches (e.g., static timing analysis using a compressed rail representation of power supply/ground levels) can have up to a +/−50% error versus full, detailed, dynamic simulation with voltage waveforms on a per-cell basis, and an up to 10% error at the level of individual timing paths. This level of error has caused significant mispredictions of chip performance and caused timing yield failures in a number of instances.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 14:
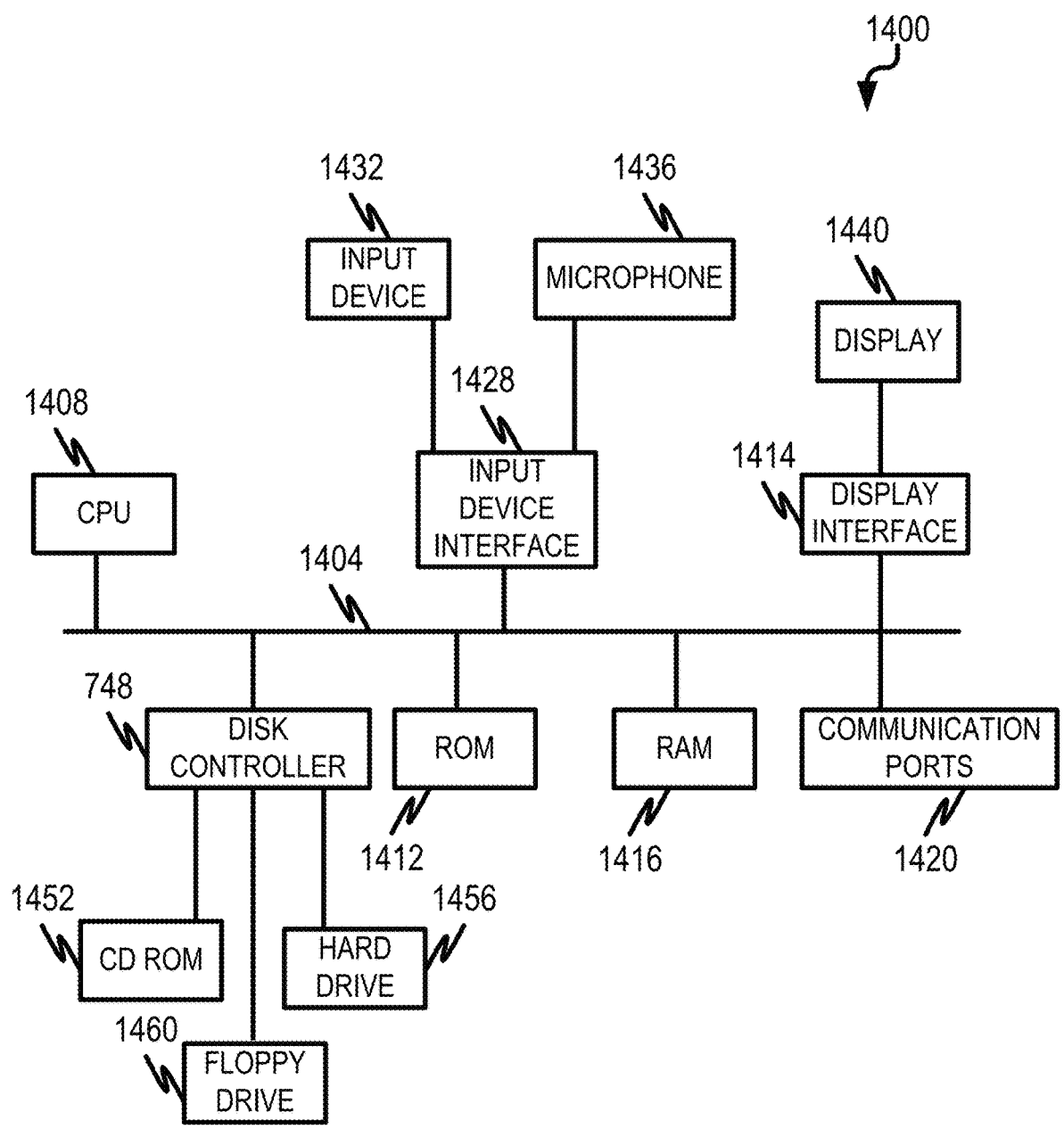
FIG. 14 illustrates an example computing architecture for implementing various aspects described herein.

FIG. 14 is a diagram 1400 illustrating a sample computing device architecture for implementing various aspects described herein. A bus 1404 can serve as the information highway interconnecting the other illustrated components of the hardware. A processing system 1408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1412 and random access memory (RAM) 1416, can be in communication with the processing system 1408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1448 can interface one or more optional disk drives to the system bus 1404. These disk drives can be external or internal floppy disk drives such as 1460, external or internal CD-ROM, CD-R, CD-RW or DVD, or solid state drives such as 1452, or external or internal hard drives 1456. As indicated previously, these various disk drives 1452, 1456, 1460 and disk controllers are optional devices. The system bus 1404 can also include at least one communication port 1420 to allow for communication with external devices either physically connected to the computing system or available externally through a wired or wireless network. In some cases, the communication port 1420 includes or otherwise comprises a network interface.

To provide for interaction with a user, the subject matter described herein can be implemented on a computing device having a display device 1440 (e.g., a CRT (cathode ray tube) or LCD (liquid crystal display) monitor) for displaying information obtained from the bus 1404 to the user and an input device 1432 such as keyboard and/or a pointing device (e.g., a mouse or a trackball) and/or a touchscreen by which the user can provide input to the computer. Other kinds of input devices 1432 can be used to provide for interaction with a user as well; for example, feedback provided to the user can be any form of sensory feedback (e.g., visual feedback, auditory feedback by way of a microphone 1436, or tactile feedback); and input from the user can be received in any form, including acoustic, speech, or tactile input. In the input device 1432 and the microphone 1436 can be coupled to and convey information via the bus 1404 by way of an input device interface 1428. Other computing devices, such as dedicated servers, can omit one or more of the display 1440 and display interface 1414, the input device 1432, the microphone 1436, and input device interface 1428.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for remedying edge defects of a geometric model implemented by one or more data processors forming part of at least one computing device, the method comprising:
   receiving, by at least one data processor, the geometric model of a physical object, the geometric model having a plurality of model edges, the geometric model being a computer-aided design (CAD) model;
   segmenting, by at least one data processor, each edge of the plurality of model edges into a plurality of segments according to a grid having a plurality of cells overlaid onto the geometric model;
   determining, by at least one data processor, a respective centroid of each respective cell having a segmented edge within the respective cell;
   identifying, by at least one data processor, a current cell adjacent to an adjacent cell in the grid, the current cell having a segmented edge, and the adjacent cell having a segmented edge;
   connecting, by at least one data processor, a centroid of the current cell with a centroid of the adjacent cell to generate a refined segmented edge;
   projecting, by at least one data processor, the refined segmented edge on a corresponding model edge having an edge defect to generate a projected edge without a short cyclic loop; and
   providing, by at least one data processor, a refined CAD model without the edge defects and having one or more projected edges for further model characterization of the physical object;
   wherein the edge defects include a spatial gap between two segmented edges or an unconnected edge crossing.

2. The method of claim 1, further comprising:
   subdividing, by at least one data processor, a portion of the grid having identified segmented edges; and
   repeating the determining, identifying, connecting, and subdividing until a predefined refinement level is achieved.

3. The method of claim 2, wherein the predefined refinement level is provided by a user via a graphical user interface.

4. The method of claim 1, wherein the grid is an octree grid.

5. The method of claim 1, wherein the geometric model is a three-dimensional (3-D) geometric model.

6. The method of claim 1, wherein the receiving, segmenting, determining, identifying, connecting, and providing occur in a simulation environment.

7. The method of claim 1, further comprising:
   identifying, by at least one data processor, the short cyclic loop, wherein the short cyclic loop is connected to the refined segmented edge; and
   removing, by at least one data processor, one or more cells containing the short cyclic loop from the refined segmented edge prior to the projecting.

8. The method of claim 1, wherein the physical object is built or modified based on the refined model.

9. The method of claim 1, wherein the geometric model is received from a user input via a graphical user interface, a mechanical image of the physical object, or a computed tomography scan of the physical object.

10. A system for remedying edge defects of a geometric model, the system comprising:
    at least one data processor; and
    memory storing instructions which, when executed by the at least one data processor, result in operations comprising:
      receiving the geometric model of a physical object, the geometric model having a plurality of model edges, the geometric model being a computer-aided design (CAD) model;
      segmenting each edge of the plurality of model edges into a plurality of segments according to a grid having a plurality of cells onto the geometric model;
      determining a respective centroid of each respective cell having a segmented edge within the respective cell;
      identifying a current cell adjacent to an adjacent cell in the grid, the current cell having a segmented edge, and the adjacent cell have a segmented edge;
      connecting a centroid of the current cell with a centroid of the adjacent cell to generate a refined segmented edge;
      projecting the refined segmented edge on a corresponding model edge having an edge defect to generate a projected edge without a short cyclic loop; and
      providing a refined CAD model having one or more projected edges without the edge defects and for further model characterization of the physical object;
    wherein the edge defects include a spatial gap between two segmented edges or an unconnected edge crossing.

11. The system of claim 10, wherein the operations further comprise:
    subdividing a portion of the grid having segmented edges; and
    repeating the determining, identifying, connecting, and subdividing until a predefined refinement level is achieved.

12. The system of claim 11, wherein the predefined refinement level is provided by a user via a graphical user interface.

13. The system of claim 10, wherein the grid is an octree grid.

14. The system of claim 10, wherein the geometric model is a three-dimensional (3-D) geometric model.

15. The system of claim 10, wherein the receiving, segmenting, determining, identifying, connecting, and providing occur in a simulation environment.

16. The system of claim 10, wherein the operations further comprise:
    identifying the short cyclic loop, wherein the short cyclic loop is connected to the refined segmented edge; and
    removing one or more cells containing the short cyclic loop from the refined segmented edge segment prior to the projecting.

17. The system of claim 10, wherein the physical object is built or modified based on the refined model.

18. The system of claim 10, wherein the geometric model is received from a user input via a graphical user interface, a mechanical image of the physical object, or a computed tomography scan of the physical object.

19. The method of claim 1, wherein the grid is a packed sphere grid.

20. The system of claim 10, wherein the grid is a packed sphere grid.

21. A non-transitory computer-readable medium for remedying edge defects of a geometric model, the non-transitory computer-readable medium storing instructions which, when executed by at least one data processor, result in operations comprising:

receiving the geometric model of a physical object, the geometric model having a plurality of model edges, the geometric model being a computer-aided design (CAD) model;

segmenting each edge of the plurality of model edges into a plurality of segments according to a grid having a plurality of cells onto the geometric model;

determining a respective centroid of each respective cell having a segmented edge within the respective cell;

identifying a current cell adjacent to an adjacent cell in the grid, the current cell having a segmented edge, and the adjacent cell have a segmented edge;

connecting a centroid of the current cell with a centroid of the adjacent cell to generate a refined segmented edge;

projecting the refined segmented edge on a corresponding model edge having an edge defect to generate a projected edge without a short cyclic loop; and providing a refined CAD model having one or more projected edges without the edge defects and for further model characterization of the physical object;

wherein the edge defects include a spatial gap between two segmented edges or an unconnected edge crossing.

22. The non-transitory computer-readable medium of claim 21, wherein the operations further comprise:

subdividing a portion of the grid having segmented edges; and repeating the determining, identifying, connecting, and subdividing until a predefined refinement level is achieved.

23. The non-transitory computer-readable medium of claim 22, wherein the predefined refinement level is provided by a user via a graphical user interface.

24. The non-transitory computer-readable medium of claim 21, wherein the geometric model is a three-dimensional (3-D) geometric model.

25. The non-transitory computer-readable medium of claim 21, wherein the operations further comprise:

identifying the short cyclic loop, wherein the short cyclic loop is connected to the refined segmented edge; and removing one or more cells containing the short cyclic loop from the refined segmented edge segment prior to the projecting.

* * * * *